United States Patent
Sun (10) Patent No.: US 9,027,329 B2
(45) Date of Patent: May 12, 2015

(54) METHOD FOR DETERMINING LOAD OF A PARTICULATE FILTER

(75) Inventor: Min Sun, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 988 days.

(21) Appl. No.: 13/115,915

(22) Filed: May 25, 2011

(65) Prior Publication Data

US 2012/0297751 A1 Nov. 29, 2012

(51) Int. Cl.
| | |
|---|---|
| *F01N 3/00* | (2006.01) |
| *F01N 3/02* | (2006.01) |
| *F01N 9/00* | (2006.01) |
| *F01N 11/00* | (2006.01) |
| *F01N 3/023* | (2006.01) |

(52) U.S. Cl.
CPC .............. *F01N 9/002* (2013.01); *Y02T 10/47* (2013.01); *F01N 11/00* (2013.01); *F01N 3/023* (2013.01); *F01N 2900/1606* (2013.01)

(58) Field of Classification Search
CPC ......... F01N 3/021; F01N 3/023; F01N 3/035; F01N 9/002; F01N 11/00; F01N 2900/1606; F02D 41/029; Y02T 10/47
USPC ............................ 60/274, 276, 295, 297, 311
See application file for complete search history.

(56) References Cited

U.S. PATENT DOCUMENTS

| | | | |
|---|---|---|---|
| 7,478,527 B2 * | 1/2009 | Wills ............................... | 60/295 |
| 8,196,392 B2 * | 6/2012 | Rodman et al. ................. | 60/295 |
| 2011/0066354 A1 | 3/2011 | Cassani et al. | |
| 2011/0173952 A1 | 7/2011 | Cassani et al. | |

FOREIGN PATENT DOCUMENTS

| | | |
|---|---|---|
| GB | 0903062.8 | 2/2009 |
| GB | 1005188.6 | 3/2010 |

OTHER PUBLICATIONS

U.S. Appl. No. 13/105,054.
U.S. Appl. No. 13/115,911.

* cited by examiner

*Primary Examiner* — Jason Shanske
*Assistant Examiner* — Diem Tran (57) ABSTRACT

A particulate filter is monitored for a particulate matter load when fluidly coupled to an internal combustion engine. Monitoring of the particulate filter is achieved by determining a rate of production of particulate matter from the internal combustion engine, a rate of capture of the particulate matter within the particulate filter, a regeneration rate for the particulate filter, and an amount of particulate matter collected in the particulate filter.

18 Claims, 4 Drawing Sheets

METHOD FOR DETERMINING LOAD OF A PARTICULATE FILTER

TECHNICAL FIELD

This disclosure is related to exhaust aftertreatment systems.

BACKGROUND

The statements in this section merely provide background information related to the present disclosure. Accordingly, such statements are not intended to constitute an admission of prior art.

Known aftertreatment systems for managing and treating an exhaust gas feedstream include a particulate filter device that removes particulate matter, e.g., elemental carbon particles from the feedstream. Known applications for a particulate filter device include internal combustion engines operating lean of stoichiometry, including, e.g., compression-ignition (diesel) engines and lean-burn spark-ignition engines. Known particulate filter devices may be regenerated using high temperature exhaust gas for a specific time period, independent of load.

SUMMARY

A particulate filter is monitored for a particulate matter load when fluidly coupled to an internal combustion engine. Monitoring of the particulate filter is achieved by determining a rate of production of particulate matter from the internal combustion engine, a rate of capture of the particulate matter within the particulate filter, a regeneration rate for the particulate filter, and an amount of particulate matter collected in the particulate filter.

BRIEF DESCRIPTION OF THE DRAWINGS

One or more embodiments will now be described, by way of example, with reference to the accompanying drawings, in which.

DETAILED DESCRIPTION

Figure 1:
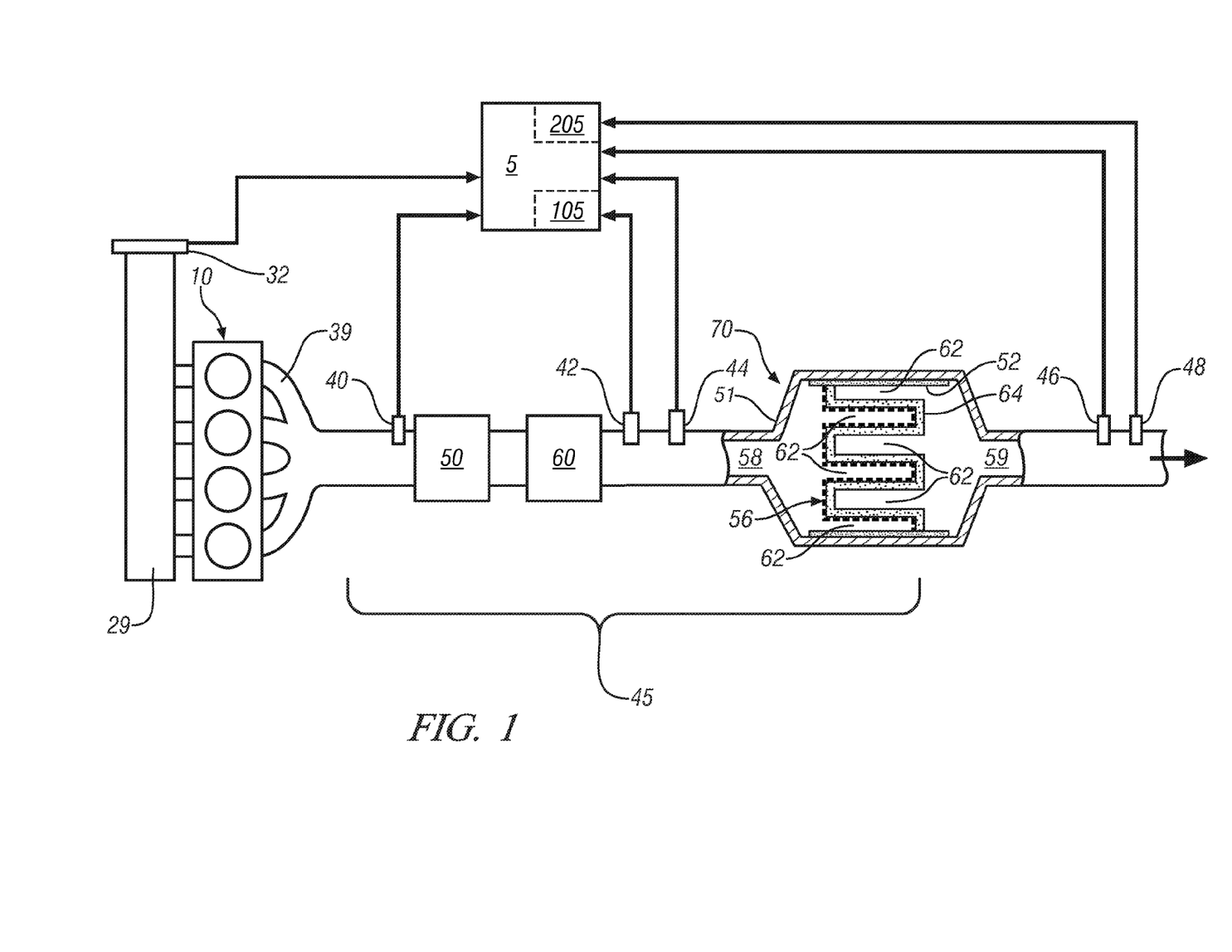
FIG. 1 illustrates an engine and exhaust aftertreatment system and an accompanying control system that has been constructed in accordance with the present disclosure.

Referring now to the drawings, wherein the showings are for the purpose of illustrating certain exemplary embodiments only and not for the purpose of limiting the same, FIG. 1 schematically illustrates an engine 10 and exhaust aftertreatment system 45 and an accompanying control system including control module 5. The exhaust aftertreatment system 45 is fluidly coupled to an exhaust manifold 39 of the internal combustion engine 10.

The engine 10 includes a multi-cylinder direct-injection four-stroke internal combustion engine that is operative lean of a stoichiometric air-fuel ratio to generate mechanical power that may be transmitted to a driveline. An air intake system channels intake air to an intake manifold 29 which directs and distributes the air into intake passages to each combustion chamber of the engine 10. The air intake system includes air flow ductwork and devices for monitoring and controlling the engine intake air flow. The devices preferably include a mass air flow sensor 32 for monitoring mass air flow through the engine 10 and intake air temperature. Other engine control devices include, e.g., a throttle valve for controlling air flow to the engine 10. The exhaust manifold 39 channels an exhaust gas feedstream to the exhaust aftertreatment system 45.

The exhaust aftertreatment system 45 includes a particulate filter 70 configured to remove particulate matter from the exhaust gas feedstream. A first aftertreatment device 50 is upstream of a second aftertreatment device 60. The particulate filter 70 is a third aftertreatment device placed downstream of the first and second aftertreatment devices 50 and 60. The first aftertreatment device 50 includes an oxidation catalyst and the second aftertreatment device 60 includes a selective catalyst reduction device. The aftertreatment devices 50, 60, and 70 are fluidly connected as a part of the exhaust system 45 to treat engine exhaust.

The exhaust aftertreatment system 45 is equipped with a plurality of sensing device(s) to monitor the exhaust gas feedstream. The sensing devices preferably include a wide-range air-fuel ratio sensor 40 operative to monitor the exhaust gas feedstream output from the engine 10. A first temperature sensor 42 monitors temperature of the exhaust gas feedstream upstream of the particulate filter 70. A first pressure sensor 44 monitors pressure of the exhaust gas feedstream upstream of the particulate filter 70. A second pressure sensor 46 monitors pressure of the exhaust gas feedstream downstream of the particulate filter 70. A second temperature sensor 48 monitors temperature of the exhaust gas feedstream downstream of the particulate filter 70. Sensing device(s) are monitored by the control module 5. The first and second temperature sensors 42 and 48 and the first and second pressure sensors 44 and 46 are shown as individual components in one embodiment, but the disclosure is not so limited. Furthermore, the first and second pressure sensors 44 and 46 may be replaced with a differential pressure sensing system comprising a single sensor that is operative to monitor a pressure differential between an inlet and an outlet of the particulate filter 70 and operative to monitor inlet pressure to the particulate filter 70. The first pressure sensor 44 may be a manifold absolute pressure sensor. The second pressure sensor 46 may be eliminated in one embodiment. The configuration of sensors is illustrative of one embodiment and is not meant to be restrictive.

The control system includes a set of control routines executed in the control module 5 including control a scheme 105 to monitor the particulate filter 70. Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other suitable components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals or loop cycles, for example each 3.125, 6.25, 12.5, 25 and 100 milliseconds during ongoing engine and vehicle operation. Alternatively, routines may be executed in response to occurrence of an event. The control system may be further capable to control operation of the engine 10, including controlling operation at a preferred air-fuel ratio to achieve performance parameters related to operator requests, fuel consumption, emissions, and driveability, with the intake air flow controlled to achieve the preferred air-fuel ratio. Engine control may include periodically controlling engine operation to regenerate the particulate filter 70. The control module 5 is also signally connected to an operator interface for communicating with the operator.

The particulate filter 70 includes a metallic housing 51 having an inlet 58 and an outlet 59 that provides a structural housing for a substrate 64 disposed intermediate the inlet 58 and outlet 59. The inlet 58 fluidly connects to an outlet of the second aftertreatment device 60. The outlet 59 fluidly connects to the remainder of the exhaust system. Insulative support material 52 wraps around the substrate 64 and mechanically supports and secures the substrate 64 within the metallic housing 51. The insulative support material 52 also provides a sealing function to ensure that the exhaust gas feedstream flows through the substrate 64 from the inlet 58 to the outlet 59. The substrate 64 may be coated with a washcoat material 56, shown as applied on the inlet side of the substrate 64 in one embodiment. Preferred washcoat materials may include either an alumina-based washcoat or a zirconium-based washcoat and may include catalytic metals, e.g., platinum, palladium, rhodium, and cerium.

The substrate 64 preferably has a honeycomb structure formed from extruded cordierite with a multiplicity of parallel flow passages 62 formed parallel to an axis between the inlet 58 and the outlet 59. Walls of the substrate 64 formed between the flow passages 62 by the extruded cordierite are porous. Each of the flow passages 62 is preferably closed at one end. Preferably the flow passages 62 are alternately closed at an end of the filter substrate 60 facing the inlet 58 and at an end of the filter substrate 60 facing the outlet 59 in a checkerboard fashion. The alternately closed flow passages 62 cause the exhaust gas feedstream to flow through the porous walls of the substrate 64 as exhaust gas flows from the inlet 58 to the outlet 59 due to the pressure differential in the exhaust gas feedstream between the inlet 58 and the outlet 59 during engine operation. Flow of the exhaust gas feedstream through the porous walls of the substrate 64 serves to filter or strip particulate matter out of the exhaust gas feedstream and bring the exhaust gas feedstream in close proximity to the washcoat. Alternatively other filtering substrates may be used in place of the substrate 64 having the wall-flow design described herein.

The control scheme 105 monitors engine operation, the exhaust gas feedstream and the particulate filter 70 to monitor soot generation and detect when regeneration of the particulate filter 70 is necessary. Regeneration is a process by which particulate matter captured by the particulate filter 70 is removed. Known strategies for particulate filter regeneration include burning the trapped particulate matter in the particulate filter 70 by increasing temperatures in the exhaust gas feedstream using modified air/fuel ratio control schemes, oxidation catalysts, and/or heating elements. The control module 5 executes commands to regenerate the particulate filter 70 using predetermined criteria associated with parameters that indicate soot generation. The parameters that indicate soot generation include, e.g., engine run time, mileage driven, fuel consumption, exhaust pressure change, and other criteria and may be utilized to create a soot generation simulation model. The soot generation simulation model may be executed using one or more of the parameters that indicate soot generation.

The control module 5 monitors the soot generation simulation model using a soot loading model 205 to determine an amount of particulate matter that is collected in the particulate filter 70. The control module 5 uses the soot loading model 205 to determine when a regeneration event is required, duration of the regeneration event, and a regeneration temperature. The soot loading model 205 includes an upper soot loading threshold and a lower soot loading threshold. The upper soot loading threshold determines the point above which the regeneration event begins based upon soot loading characteristics. The lower soot loading threshold determines the lower limit below which the regeneration event is to be terminated based upon the soot loading characteristics. Both the upper soot loading threshold and the lower soot loading threshold may be determined from experimental data for a particular application prior to installation, or may be determined within the soot loading model 205. The control module 5 sends a command to start the regeneration event and a command to terminate the regeneration event.

A regeneration event is required when the upper soot loading threshold has been exceeded as determined by the soot loading model 205. The soot loading model 205 determines a soot flow rate produced by the engine 10 under current operating conditions while in operation and may be in any suitable units, e.g., mass flow rate or molar flow rate. For example, when the engine 10 is being operated under a high load, more soot is being generated than when the engine 10 is being operated under low load. The soot loading model 205 uses the soot flow rate from the engine 10 and a filtration efficiency of the particulate filter 70 to determine an amount of soot collected, or soot load, in the particulate filter 70. The soot load may be measured using any suitable measurement, e.g., mass (grams) or volume-normalized mass (grams per liter). The filtration efficiency takes into account filter efficiency changes between an unsoiled filter and when the filter loads with soot.

The soot loading model 205 determines a soot reaction rate from active and passive chemical reactions at temperatures occurring within the particulate filter 70. The active chemical reaction occurs under higher exhaust gas temperature ranges, e.g., temperatures associated with rich engine operation, within the particulate filter 70 converting soot and oxygen to carbon dioxide molecules. The passive chemical reaction includes converting soot and nitrogen dioxide molecules into carbon dioxide and nitrogen monoxide molecules, which occurs within the particulate filter 70 at lower exhaust gas temperature ranges, e.g., temperatures associated with lean engine operation. The passive chemical reaction may be enhanced by having a washcoat 56 that is designed to convert nitrogen monoxide into nitrogen dioxide. The passive chemical reaction also occurs to a lesser extent in an embodiment of the particulate filter 70 not having washcoat 56.

The soot loading model 205 may determine a preferred temperature for the active chemical reaction. It is appreciated that the collected amount of soot within the particulate filter 70 has a particular flash point that correlates to the soot load. The flash point is the temperature at which the soot uncontrollably combusts. It is appreciated that regeneration efficiency increases with increasing combustion temperature. Therefore, the soot loading model 205 may be used to determine the preferred temperature for the active chemical reaction correlated to soot loading in the particulate filter 70. The preferred temperature for the active chemical reaction correlated to soot loading in the particulate filter 70 is a maximum combustion temperature occurring below the flash point associated with the soot loading in the particulate filter 70. The soot loading model 205 may calculate or utilize a look-up table to establish the preferred temperature for the active chemical reaction for efficient regeneration. The soot loading model 205 may adjust the preferred temperature in response to a change in the soot loading on the particulate filter 70. This permits operation that increases regeneration efficiency when the soot load decreases during a regeneration event and prevents uncontrolled combustion.

The soot loading model 205 may utilize two-dimensional look-up tables in place of three-dimensional or higher look-up tables to determine a result with more than two inputs. The soot loading model 205 is able to combine two inputs as a single multiplication input ζ to the two-dimensional look-up table. The multiplication input ζ represents the multiplication of soot loading per liter and resident time for the passive chemical reaction and the active chemical reaction. Utilizing the two-dimensional look-up table in this manner results in faster calculation, less control module memory, and more robust results in determining the reaction rate for the passive chemical reaction and the active chemical reaction.

Therefore, the particulate filter 70 may be monitored for particulate matter loading by determining the rate of production of particulate matter from the internal combustion engine 10. The rate of particulate matter capture is determined based on the amount of particulate matter produced and the efficiency of the particulate filter 70. The regeneration rate for both the reaction rate for the passive chemical reaction and the active chemical reaction is determined to calculate the amount of particulate matter loading in the particulate filter 70.

Since the soot loading model 205 may determine an amount of soot within the particulate filter 70, a regeneration event, and a regeneration rate for a particular soot load, an error detection scheme may be developed to determine when excessive regeneration is occurring. Additional details respecting error detection can be found in commonly owned and co-pending U.S. application Ser. No. 13/115,911, the contents of which are incorporated herein by reference.

The soot loading model 205 may be further explained by reviewing equations associated therewith. The active chemical reaction that occurs under high exhaust gas temperatures may be expressed as:

$$C+O_2=CO_2 \qquad [1]$$

wherein
C represents carbon,
$O_2$ represents oxygen molecules, and
$CO_2$ represents carbon dioxide molecules at the exhaust gas flow rate.

The passive chemical reaction that occurs under low exhaust gas temperatures may be expressed as:

$$C+2NO_2=CO_2+2NO \qquad [2]$$

wherein
$NO_2$ represents nitrogen dioxide molecules, and
NO represents nitrogen monoxide molecules at the exhaust gas flow rate.

The soot loading model 205 may be expressed by the following governing equation:

$$M_{soot\_t}=M_{soot\_t-\Delta t}+(PM_{engine} \cdot \eta_{dpf\_fil}-R_{O2}-R_{NO2})\Delta t \qquad [3]$$

wherein
$M_{soot\_t}$ is the soot loading for the current control loop,
$M_{soot\_t-\Delta t}$ is soot loading for the previous control loop,
$PM_{engine}$ is the soot flow rate produced by the engine,
$\eta_{dpf\_fil}$ is the filtration efficiency of the particulate filter,
$R_{O2}$ is the active chemical reaction rate of the reaction expressed in Eq. 1,
$R_{NO2}$ is the passive chemical reaction rate of the reaction expressed in Eq. 2, and
$\Delta t$ is the elapsed time between the previous control loop and the current control loop.

Figure 2:
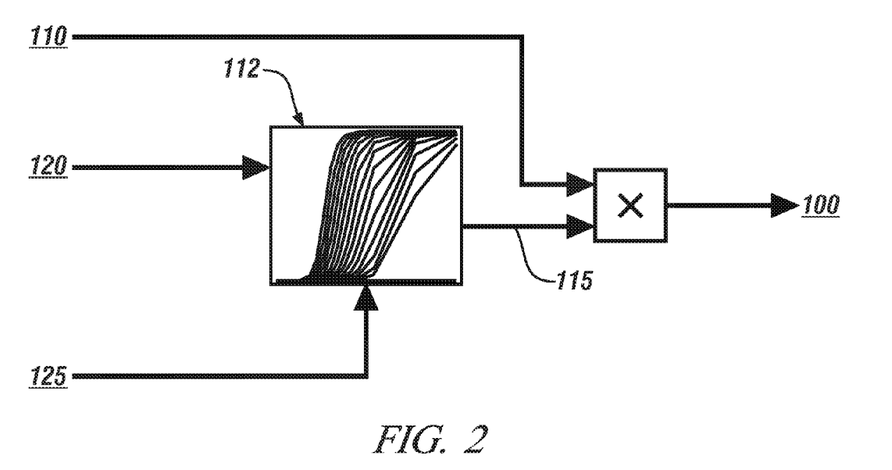
FIG. 2 illustrates a calculation flow chart showing inputs and a relationship of the inputs with respect to determining an active chemical reaction rate, in accordance with the present disclosure.

FIG. 2 schematically illustrates a calculation flow chart showing the inputs and a relationship of the inputs with respect to determining the active chemical reaction rate of Eq. 1. The overlying equation to determine the active chemical reaction rate of Eq. 1 may be calculated by the following equation:

$$R_{O2}=\dot{M}_{O2\_in} \cdot \eta_{O2\_table}(T_{soot},\zeta_{O2}) \qquad [4]$$

wherein
$R_{O2}$ 100 is the active chemical reaction rate expressed in Eq.
$\dot{M}_{O2\_in}$ 110 is the molecular flow rate, in moles, of oxygen flowing into a soot layer in the particulate filter 70, an
$\eta_{O2\_table}(T_{soot},\zeta_{O2})$ 115 is the oxygen conversion efficiency corresponding to an oxygen conversion efficiency table 112.

The oxygen conversion efficiency table 112 determines the oxygen conversion efficiency through the relationship of a soot temperature $T_{soot}$ 120 and an $O_2$ multiplication input $\zeta_{O2}$ 125. The $O_2$ multiplication input $\zeta_{O2}$ 125 may be determined by the following equation:

$$\zeta_{O2}=M_{soot\_t\_1} \cdot t_{resident\_O2} \qquad [5]$$

wherein
$M_{soot\_t\_1}$ is the amount of soot loading over the particulate filter volume, and
$t_{resident\_O2}$ is the resident time for the chemical reaction of soot and oxygen.

Figure 3:
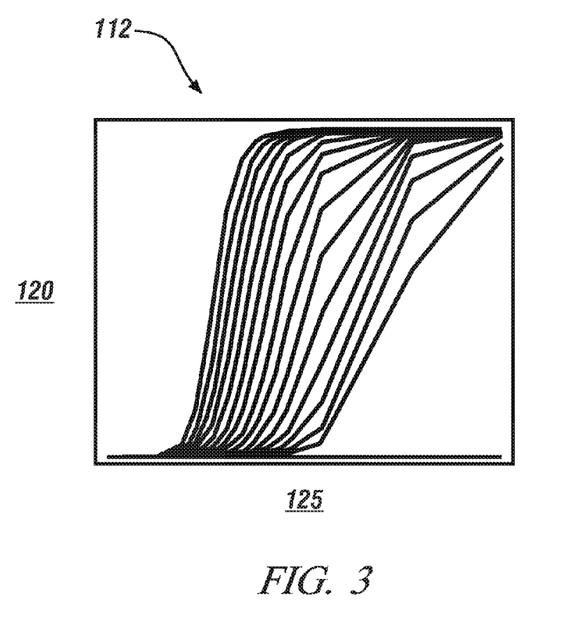
FIG. 3 graphically depicts a relationship for oxygen conversion efficiency as a function of soot temperature $T_{soot}$ and $O_2$ multiplication input $\zeta_{O2}$, in accordance with the present disclosure.

FIG. 3 graphically depicts a relationship between oxygen conversion efficiency, soot temperature $T_{soot}$ 120, and $O_2$ multiplication input $\zeta_{O2}$ 125 wherein oxygen conversion efficiency $\eta_{O2\_table}(T_{soot},\zeta_{O2})$ 115 may be expressed in relation to the soot temperature $T_{soot}$ 120 and the $O_2$ multiplication input $\zeta_{O2}$ 125. The relation may be executed as a two-dimensional look-up table 112. The resident time for the chemical reaction of soot and oxygen $t_{resident\_O\,2}$ may be determined from the following equation:

$$t_{resident\_O2} = \frac{V_{dpf}}{\dot{V}_{exh}} \qquad [6]$$

wherein $V_{dpf}$ is the particulate filter volume, and $\dot{V}_{exh}$ is the exhaust gas volumetric flow rate through the particulate filter 70.

Figure 4:
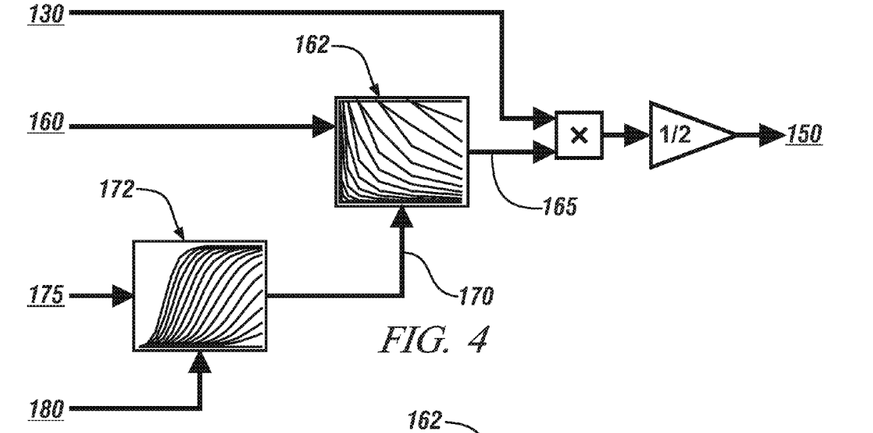
FIG. 4 schematically illustrates a calculation flow chart showing inputs and a relationship of the inputs with respect to determining a passive chemical reaction rate, in accordance with the present disclosure.

FIG. 4 schematically illustrates a calculation flow chart showing the inputs and a relationship of the inputs with respect to determining the passive chemical reaction rate of Eq. 2. The overlying equation to determine the passive chemical reaction rate of Eq. 2 may be calculated by the following equation:

$$R_{NO2} = \frac{1}{2} \dot{M}_{NO2\_in} \cdot \eta_{NO2\_table\_corr}(C_{NO2\_in}, \eta_{NO2\_raw}) \qquad [7]$$

wherein $R_{NO2}$ 150 is the passive chemical reaction rate expressed in Eq. 2, $\dot{M}_{NO2\_in}$ 130 representing the molecular flow rate, in moles, of $NO_2$ that flows into the soot layer of the particulate filter 70, and $\eta_{NO2\_table\_corr}(C_{NO2\_in}, \eta_{NO2\_raw})$ 165 is the $NO_2$ conversion efficiency determined from an $NO_2$ conversion efficiency table 162.

The $NO_2$ conversion efficiency table 162 determines the $NO_2$ conversion efficiency through the relationship of a concentration of $NO_2$ gas flow rate $C_{NO2\_in}$ 160 flowing into the soot layer of the particulate filter and a base conversion efficiency of $NO_2$ $\eta_{NO2\_raw}$ 170.

Figure 5:
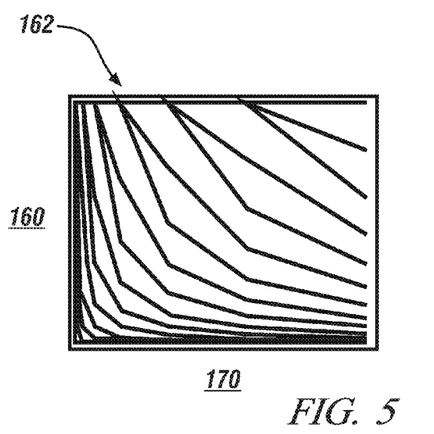
FIG. 5 graphically depicts a relationship between an $NO_2$ conversion efficiency table, base conversion efficiency of $NO_2$, and the concentration of nitrogen dioxide gas flow rate, in accordance with the present disclosure.

FIG. 5 graphically depicts a relationship between the $NO_2$ conversion efficiency $\eta_{NO2\_table\_corr}(C_{NO2\_in}, \eta_{NO2\_raw})$ 165, base conversion efficiency of $NO_2$ $\eta_{NO2\_raw}$ 170, and the concentration of nitrogen dioxide gas flow rate $C_{NO2\_in}$ 160 wherein the $NO_2$ conversion efficiency $\eta_{NO2\_table\_corr}(C_{NO2\_in}, \eta_{NO2\_raw})$ 165 may be expressed in relation to the base conversion efficiency of $NO_2$ $\eta_{NO2\_raw}$ 170 and the concentration of nitrogen dioxide gas flow rate $C_{NO2\_in}$ 160. The base conversion efficiency of $NO_2$ $\eta_{NO2\_raw}$ 170 is determined from the following equation:

$$\eta_{NO2\_raw} = \eta_{NO2\_table\_raw}(T_{soot}, \zeta_{NO2}) \qquad [8]$$

wherein $\eta_{NO2\_table\_raw}(T_{soot}, \zeta_{NO2})$ is the base nitrogen dioxide conversion efficiency determined from an $NO_2$ look-up table 172.

The $NO_2$ look-up table 172 determines the base nitrogen dioxide conversion efficiency $\eta_{NO2\_raw}$ 170 with respect to soot temperature $T_{soot}$ 175 and an $NO_2$ multiplication input $\zeta_{NO2}$ 180. The $NO_2$ multiplication input $\zeta_{NO2}$ 180 may be determined by the following equation:

$$\zeta_{NO2} = M_{soot\_t\_1} t_{resident\_NO2} \qquad [9]$$

wherein $M_{soot\_t\_1}$ represents an amount of soot loading over the volume of the particulate filter, and $t_{resident\_NO2}$ represents the resident time for the reaction of soot and nitrogen dioxide.

Figure 6:
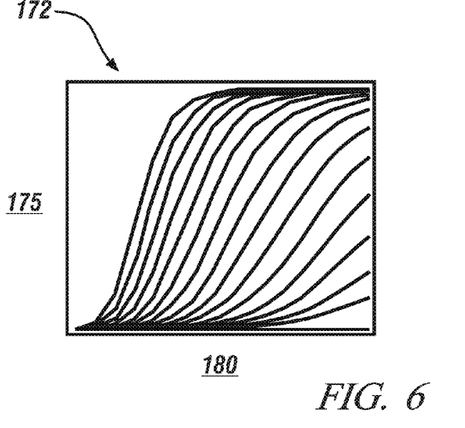
FIG. 6 graphically depicts a relationship between the base conversion efficiency of $NO_2$, soot temperature, and an $NO_2$ multiplication input, in accordance with the present disclosure.

FIG. 6 graphically depicts a relationship between the base conversion efficiency of $NO_2$ $\eta_{NO2\_raw}$ 170, soot temperature $T_{soot}$ 175 and the $NO_2$ multiplication input $\zeta_{NO2}$ 180 wherein the base conversion efficiency of $NO_2$ $\eta_{NO2\_raw}$ 170 may be expressed in relation to the soot temperature $T_{soot}$ 175 and the $NO_2$ multiplication input $\zeta_{NO2}$ 180. The resident time for the reaction of soot and nitrogen $t_{resident\_NO2}$ may be determined from the following equation:

$$t_{resident\_NO2} = \frac{V_{dpf}}{\dot{V}_{exh\_NO2}} \qquad [10]$$

wherein $V_{dpf}$ is the volume of the of the particulate filter 70, and $\dot{V}_{exh\_NO2}$ is the exhaust gas volumetric flow rate flowing into the soot layer of the particulate filter 70 for the soot and nitrogen dioxide reaction.

In a situation in which the particulate filter 70 is coated with the catalyst 56, the $NO_2$ concentration of Eq. 7 may be modified to account for the effect of the catalyst. The $NO_2$ concentration flowing into the soot layer of the particulate filter $C_{NO2\_in}$ may be calculated by a volumetric flow rate weighted average when modifying Eq. 7 as follows:

$$C_{NO2\_in} = \frac{\dot{V}_{exh} \cdot C_{NO2\_up} + A_{filt} \cdot V_{gas\_mol\_mean} \cdot C_{NO2\_cat}}{\dot{V}_{exh} + A_{filt} \cdot V_{gas\_mol\_mean}} \qquad [11]$$

wherein $C_{NO2\_in}$ is the volumetric flow rate weighted average concentration, $\dot{V}_{exh}$ is exhaust gas volumetric flow rate, $C_{NO2\_up}$ is the $NO_2$ concentration of the exhaust gas flowing into the particulate filter, $A_{filt}$ is the particulate filter area, $v_{gas\_mol\_mean}$ is the effective molecular diffusion velocity of the exhaust gas, and $C_{NO2\_cat}$ is the $NO_2$ concentration at the catalyst 56 within the particulate filter 70.

The exhaust gas volumetric flow rate of Eq. 10 may be modified to factor in the total volumetric flow rate from multiple flow sources. Modifying Eq. 10 for multiple flow sources, Eq. 10 becomes the following.

$$t_{resident\_NO2} = \frac{V_{dpf}}{\dot{V}_{exh} + A_{filt} \cdot V_{gas\_mol\_mean}} \qquad [12]$$

Figure 7:
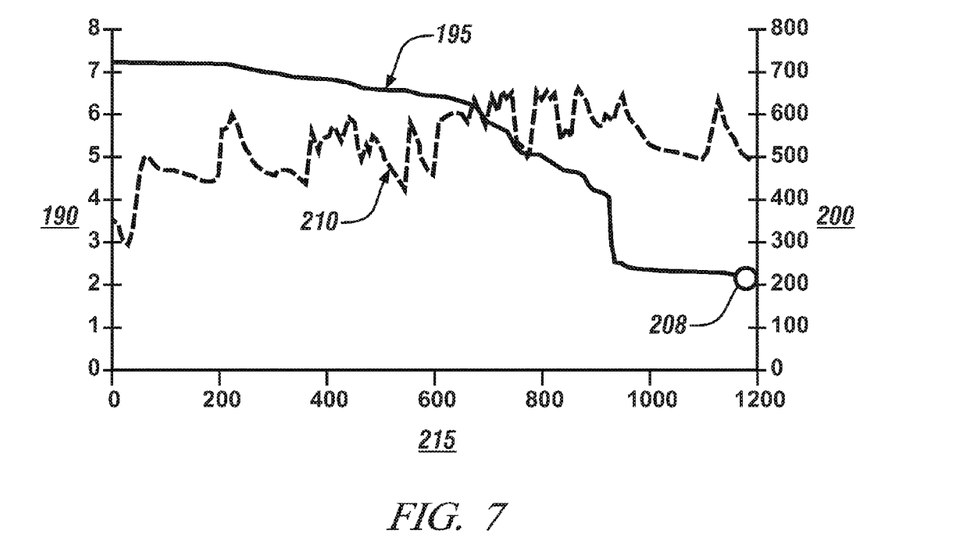
FIG. 7 illustrates experimental test data including soot load and the particulate filter inlet temperature over a specified time corresponding to the start of the active regeneration duration, in accordance with the present disclosure.

FIG. 7 graphically depicts experimental test data including soot load 190 (grams per liter) on the left vertical axis and represented by a solid line 195 and the particulate inlet filter temperature 200 (° C.) on the right vertical axis and represented by a dashed line 210 over a specified time 215 along the horizontal axis wherein the left vertical axis corresponds to the start of the active regeneration duration. The soot loading model 205 determines the soot load 190 in the particulate filter 70 exceeds the upper soot loading threshold, e.g., over 7 g/l. The soot loading model 205 initiates an active regeneration, the beginning of which coincides with the left vertical axis. The control module 5 commands the engine 10 to inject fuel into the exhaust gases thereby increasing the temperature of the exhaust. Based upon the soot load 190 calculated by the soot loading model 205 the maximum exhaust temperature below the flash point is determined and set as the flash point limit. The temperature begins to rise to a temperature below the flash point limit and the soot begins to convert to molecules of carbon dioxide. As the lower soot loading threshold is approached the soot loading model 205 commands the regeneration event to stop prior to reaching the lower soot loading threshold, e.g., 2 g/l. The amount of soot load 190 calculated by the soot loading model 205 matches the measured amount 208 at the end of the experiment.

Figure 8:
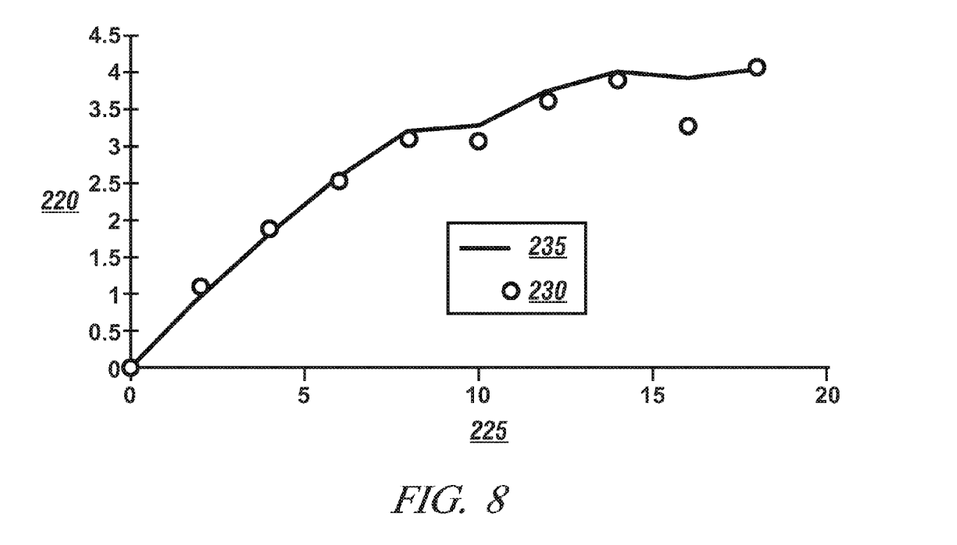
FIG. 8 illustrates an amount of soot over time wherein the left vertical axis is the start of combustion for engine operation and the start of the passive regeneration process, in accordance with the present disclosure.

FIG. 8 graphically depicts an amount of soot 220 (grams per liter) on the vertical axis over time 225 (hours) on the horizontal axis wherein the left vertical axis is the start of combustion for engine operation and the start of the passive regeneration process wherein the soot loading model output is represented by a solid line 235 and measured results are represented by dots 230. The exemplary passive regeneration occurs during lean engine operation with the washcoat 56 applied to the particulate filter 70. The engine operation produces soot that is collected within the particulate filter 70. The soot load increases until the passive regeneration begins to start converting soot at a rate approximately equal to the engine soot production creating a leveling out of the soot load. Both the soot loading model results 235 and the actual measurements indicate this pattern. The calculated amount of soot from the soot loading model 205 is very close to actual measured results throughout the graph over the time period. Determination of the soot loading model results 235 exceeding the upper soot loading threshold may result in an active regeneration process beginning.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for monitoring particulate matter loading in a particulate filter fluidly coupled to an internal combustion engine, comprising:
   determining a rate of production of particulate matter from the internal combustion engine;
   determining a rate of capture of the particulate matter within the particulate filter;
   determining a first regeneration rate of the particulate filter associated with a first reaction;
   determining a second regeneration rate of the particulate filter associated with a second reaction;
   determining an amount of particulate matter collected in the particulate filter corresponding to said rate of production, said rate of capture and said regeneration rates; and
   operating the internal combustion engine in a mode conducive to a regeneration event in the particulate filter when the amount of particulate matter collected in the particulate filter exceeds a soot loading threshold.

2. The method of claim 1, wherein the rate of capture is determined as a function of the rate of production and a filter efficiency of the particulate filter.

3. The method of claim 1, wherein the first reaction comprises a reaction of carbon and oxygen.

4. The method of claim 3, wherein determining the first regeneration rate of the particulate filter associated with the reaction of carbon and oxygen comprises determining an oxygen conversion efficiency.

5. The method of claim 3, wherein determining the first regeneration rate of the particulate filter associated with the reaction of carbon and oxygen comprises determining an increase in an exhaust gas feedstream temperature associated with a regeneration efficiency.

6. The method of claim 5, wherein determining the increase in the exhaust gas feedstream temperature comprises determining a flash point limit corresponding to a flash point of the particulate matter within the particulate filter.

7. The method of claim 6, further comprising operating the engine to maintain the exhaust gas feedstream temperature below the flash point limit.

8. The method of claim 6, wherein the determining the flash point limit comprises modifying the flash point limit in response to the regeneration rate of the particulate filter during the regeneration event.

9. The method of claim 1, wherein the second reaction comprises a reaction of carbon and nitrogen dioxide.

10. The method of claim 9, wherein determining the second regeneration rate of the particulate filter associated with the reaction of carbon and nitrogen dioxide comprises determining a nitrogen dioxide conversion efficiency term corresponding to soot temperature and a concentration of nitrogen dioxide gas flow rate.

11. The method of claim 10, wherein determining the nitrogen dioxide conversion efficiency term comprises determining the nitrogen dioxide conversion efficiency term from predetermined calibrations including first and second tables, wherein:
   the first table comprises a predetermined calibration of a base conversion efficiency of nitrogen dioxide correlated to a nitrogen dioxide multiplication factor and the soot temperature; and
   the second table comprises a predetermined calibration of nitrogen dioxide conversion efficiency correlated to the base conversion efficiency of nitrogen dioxide and the concentration of nitrogen dioxide gas flow rate.

12. A method for monitoring particulate matter loading in a particulate filter fluidly coupled to an internal combustion engine, comprising:
   determining a rate of production of particulate matter from the internal combustion engine;
   determining a rate of capture of the particulate matter within the particulate filter;
   determining a first regeneration rate of the particulate filter associated with a reaction of carbon and oxygen;
   determining a second regeneration rate of the particulate filter associated with a reaction of carbon and nitrogen dioxide;
   determining an amount of particulate matter collected in the particulate filter corresponding to said rate of production, said rate of capture and said regeneration rates; and
   operating the internal combustion engine in a mode conducive to a regeneration event in the particulate filter when the amount of particulate matter collected in the particulate filter exceeds a soot loading threshold.

13. The method of claim 12, wherein determining the first regeneration rate of the particulate filter associated with the reaction of carbon and oxygen comprises determining an oxygen conversion efficiency.

14. The method of claim 13, wherein determining the first regeneration rate of the particulate filter associated with the reaction of carbon and oxygen comprises determining a flash point limit corresponding to a flash point of the particulate matter within the particulate filter.

15. The method of claim 14, further comprising operating the engine to maintain the exhaust gas feedstream temperature below the flash point limit.

16. A method for monitoring particulate matter loading in a particulate filter fluidly coupled to an internal combustion engine, comprising:
- determining a rate of production of particulate matter from the internal combustion engine;
- determining a rate of capture of the particulate matter within the particulate filter;
- determining a first regeneration rate of the particulate filter associated with a reaction of carbon and oxygen corresponding to a predetermined oxygen conversion efficiency;
- determining a second regeneration rate of the particulate filter associated with a reaction of carbon and nitrogen dioxide corresponding to a predetermined nitrogen dioxide conversion efficiency;
- determining an amount of particulate matter collected in the particulate filter corresponding to said rate of production, said rate of capture and said first and second regeneration rates; and
- operating the internal combustion engine in a mode conducive to a regeneration event in the particulate filter when the amount of particulate matter collected in the particulate filter exceeds a soot loading threshold.

17. The method of claim 16, wherein said predetermined nitrogen dioxide conversion efficiency is determined from a predetermined correspondence of base conversion efficiencies of nitrogen dioxide to concentrations of nitrogen dioxide gas flow rate.

18. The method of claim 17, wherein said base conversion efficiencies are determined from a predetermined correspondence of soot temperature and a nitrogen dioxide multiplication factor.

* * * * *